(12) United States Patent
Srikrishna

(10) Patent No.: US 8,433,144 B2
(45) Date of Patent: Apr. 30, 2013

(54) SYSTEMS AND METHODS FOR DETECTING RED-EYE ARTIFACTS

(75) Inventor: Nudurumati Srikrishna, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1236 days.

(21) Appl. No.: 12/249,910

(22) Filed: Oct. 11, 2008

(65) Prior Publication Data

US 2009/0245595 A1    Oct. 1, 2009

Related U.S. Application Data

(60) Provisional application No. 61/039,844, filed on Mar. 27, 2008.

(51) Int. Cl.
*G06K 9/62*    (2006.01)
(52) U.S. Cl.
USPC ............................ 382/224; 382/165; 382/195
(58) Field of Classification Search ................... 382/162, 382/164, 165, 173, 195, 224, 274, 286
See application file for complete search history.

(56) References Cited

U.S. PATENT DOCUMENTS

| | | | | |
|---|---|---|---|---|
| 6,980,691 B2 * | 12/2005 | Nesterov et al. | ............. | 382/165 |
| 7,567,707 B2 * | 7/2009 | Willamowski et al. | ....... | 382/167 |
| 2004/0037460 A1 * | 2/2004 | Luo et al. | ...................... | 382/165 |
| 2004/0184670 A1 * | 9/2004 | Jarman et al. | ................. | 382/274 |
| 2004/0223063 A1 * | 11/2004 | DeLuca et al. | ................ | 348/239 |
| 2004/0233299 A1 * | 11/2004 | Ioffe et al. | ..................... | 348/239 |
| 2005/0058342 A1 | 3/2005 | Chen et al. | | |
| 2007/0140556 A1 | 6/2007 | Willamowski et al. | | |
| 2008/0137944 A1 * | 6/2008 | Marchesotti et al. | ......... | 382/167 |
| 2008/0199073 A1 * | 8/2008 | Demandolx | ................... | 382/167 |

OTHER PUBLICATIONS

Automated Red-Eye Detection and Correction in Digital Photographs, International Conference on Image Processing; ICIP'04. 2004, vol. 4; Oct. 2004; pp. 2363-2366.
"Flash Cut: Foreground Extraction with Flash and No-Flash Image Pair," IEEE Conference on Computer Vision and Pattern Recognition, 2007; CVPR '07; Jun. 17-22; pp. 1-8.
"Markov Random Field Models for Unsupervised Segmentation of Textured Color Images," IEEE Transactions on Pattern Analysis and Machine Intelligence; vol. 17, No. 10; Oct. 1995; pp. 939-954.
"Texture Classifications Based on Spatial Dependence Features Using Co-Occurrence Matrices and Markov Random Fields," International Conference on Image Processing; vol. 1, No. 24-27; Oct. 2004; pp. 239-242.

* cited by examiner

*Primary Examiner* — Phuoc Tran

(57) ABSTRACT

Systems and methods for detecting red-eye artifacts in a digital image are provided. In this regard, a representative system, among others, includes a processing device that facilitates execution of programs stored in the image processing device and memory that is electrically coupled to the processing device. The memory is configured to store the programs that include a red-eye detection manager, which is configured to detect a red-eye in the digital image based on the detection of excited state of normal-eye that causes the red-eye.

17 Claims, 8 Drawing Sheets

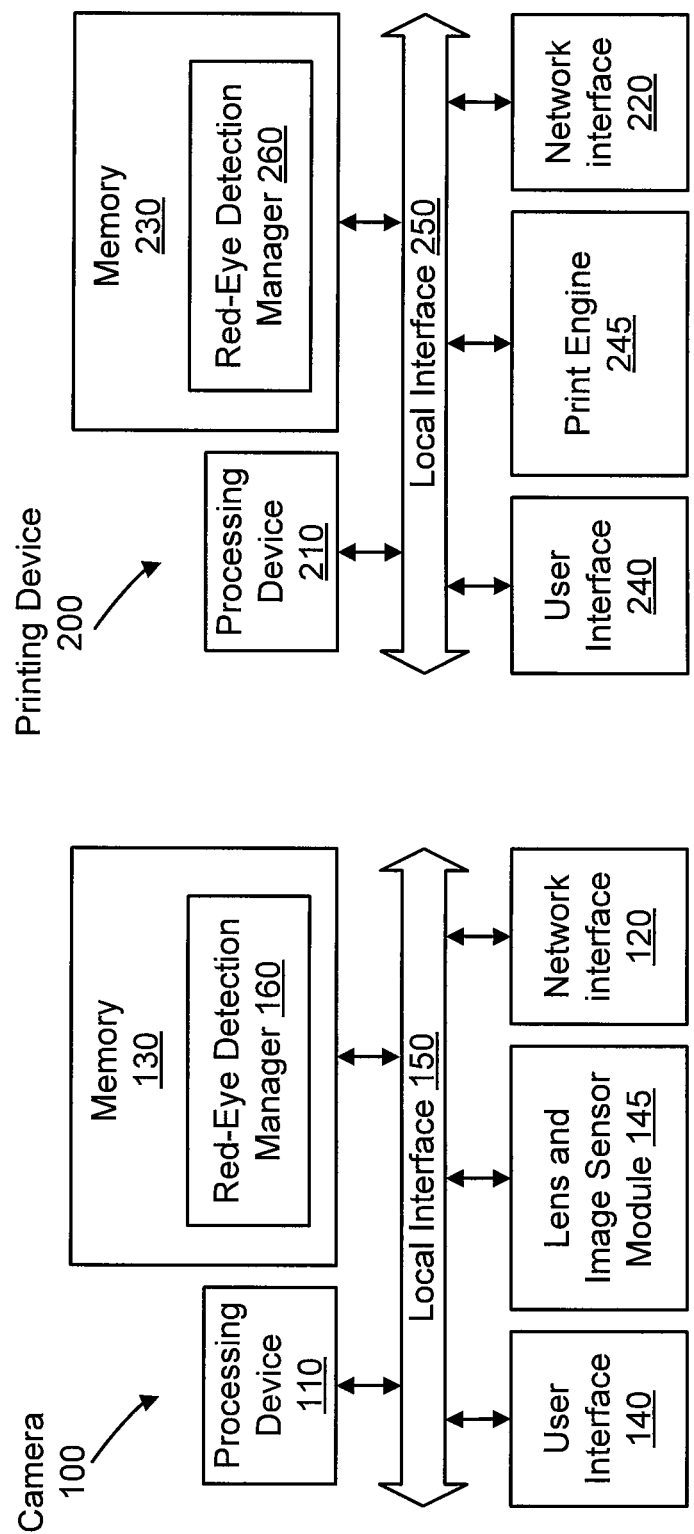

SYSTEMS AND METHODS FOR DETECTING RED-EYE ARTIFACTS

CROSS REFERENCE TO RELATED APPLICATIONS

This Application claims the benefit of provisional patent application Ser. No. 61/039,844, filed Mar. 27, 2008; entitled "Systems And Method For Detecting Red-eye Artifacts" which application is incorporated by reference herein as if reproduced in full below.

BACKGROUND

The world of digital photography is often impeded by red-eye artifacts. Existing red-eye detection techniques typically depend on a-priori image segmentation routine in an attempt to detect a face of a person. However, the detection rate generally scores as low as 50%. In some cases, over-segmentation results in false positives, yielding a poor success rate.

Current techniques may utilize the intervention of a user after the detection phase. Furthermore, these techniques may utilize a machine learning algorithm, which adds to computational overhead. To minimize this overhead, these algorithms adopt additional optimization techniques.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a block diagram that illustrates an embodiment of a camera in which red-eye artifacts can be detected.

FIG. 2 is a block diagram that illustrates an embodiment of a printing device in which red-eye artifacts can be detected.

DETAILED DESCRIPTION

Figure 3:
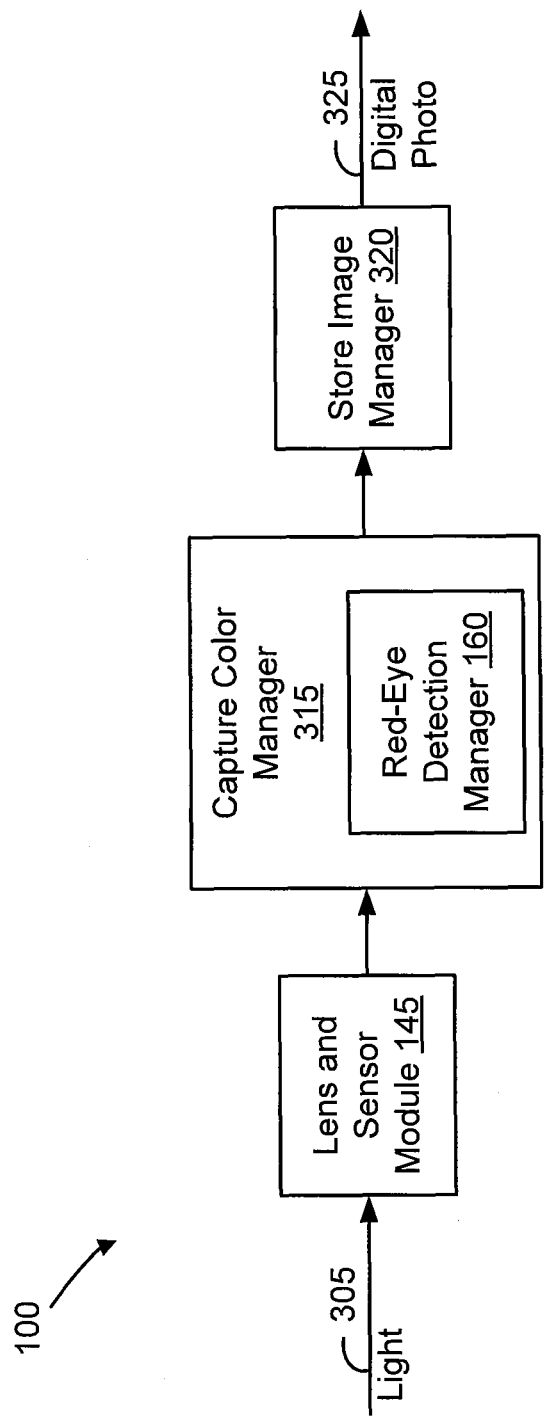
FIG. 3 is a data flow diagram that illustrates an embodiment of the architecture, functionality, and/or operation of the camera, such as that shown in FIG. 1.

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which red-eye artifacts can be detected in a digital image.

FIG. 1 is a block diagram that illustrates an embodiment of a camera 100 in which red-eye artifacts can be detected. As indicated in FIG. 1, the camera 100 comprises a processing device 110, memory 130, one or more user interface devices 140, lens and image sensor module 145, and one or more networking devices 120, each of which is connected to a local interface 150. The local interface 150 can be, for example, but not limited to, one or more buses or other wired or wireless connections, as is known in the art. The local interface 150 may have additional elements, which are omitted for simplicity, such as controllers, buffers (caches), drivers, repeaters, and receivers, to enable communications. Further, the local interface 150 may include address, control, and/or data connections to enable appropriate communications among the aforementioned components.

The processing device 110 can include any custom made or commercially available processor, a central processing unit (CPU) or an auxiliary processor among several processors associated with the camera 100, a semiconductor based microprocessor (in the form of a microchip), or a macroprocessor. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The networking devices 120 comprise the various components used to transmit and/or receive data over the network, where provided. By way of example, the networking devices 120 include a device that can communicate both inputs and outputs, for instance, a modulator/demodulator (e.g., modem), a radio frequency (RF) or infrared (IR) transceiver, a telephonic interface, a bridge, a router, as well as a network card, etc. The camera 100 can further includes one or more I/O devices (not shown) that comprise components used to facilitate connection of the camera 100 to other devices and therefore, for instance, comprise one or more serial, parallel, small system interface (SCSI), universal serial bus (USB), or IEEE 1394 (e.g., Firewire™) connection elements.

The lens and image sensor module 145 focuses light to capture an image of a scene and converts the light into electrical signals. Some of the captured image may include red-eye artifacts, which are appearance of red-eyes on the captured image generally taken with a photographic flash too close to the lens.

The memory 130 can include any one or a combination of volatile memory elements (e.g., random access memory (RAM, such as DRAM, SRAM, etc.)) and nonvolatile memory elements (e.g., ROM, hard drive, tape, CDROM, etc.). The one or more user interface devices comprise those components with which the user (e.g., administrator) can interact with the camera 100.

The memory 130 normally comprises various programs (in software and/or firmware) including at least an operating system (O/S) (not shown) and a red-eye detection manager 160. The O/S controls the execution of programs, including the red-eye detection manager 160, and provides scheduling, input-output control, file and data management, memory management, and communication control and related services. The red-eye detection manager 160 facilitates the process for detecting red-eye artifacts in a digital image. Operations of the red-eye detection manager 160 are described in relation to FIGS. 7-9.

The red-eye detection manager 160 can be embodied in any computer-readable medium for use by or in connection with any suitable instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

A nonexhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system essentially controls the execution of other computer programs, such as the red-eye detection manager 160, and provides scheduling, input-output control, file and data management, memory management, and communication control and related services.

FIG. 2 is a block diagram that illustrates an embodiment of a printing device 200 in which red-eye artifacts can be detected. The architecture for the printing device 200 is similar to the architecture of the camera 100 described above and therefore includes a processing device 210, one or more user interface devices 240, memory 230 having red-eye detection manager 260, one or more I/O devices (not shown) and one or more networking devices 220, each of which is connected to a local interface 250. The printing device 200 further includes a print engine 245 that facilitates printing a photo of captured image. The print engine 245 can comprise, for instance, a paper drive mechanism, photosensitive member, optical scanner, developing unit, fusing system, etc. Alternatively, the print engine 245 can comprise an inkjet-based print engine.

FIG. 3 is a data flow diagram that illustrates an embodiment of the architecture, functionality, and/or operation of the camera 100, such as that shown in FIG. 1. The camera 100 receives light 305 of an image by way of the lens and sensor module 145. Such lens and sensor module 145 is configured to capture light of the image and convert the light into electrical signals. The lens and sensor module 145 sends the electrical signals associated with the image to a capture color manager 315. The electrical signals are filtered in its three primary colors—red, blue and green—to obtain a full color digital image. The capture color manager 315 further includes a red-eye detection manager 160 that facilitates the process for detecting red-eye artifacts in the digital image. The full color digital image having information associated with red-eye artifacts are sent to store image manager 320, which facilitates storing the full color digital image along with the information associated with detecting the red-eye artifacts. The digital photo 325 is sent to memory 130 (FIG. 1) to be stored.

Figure 4:
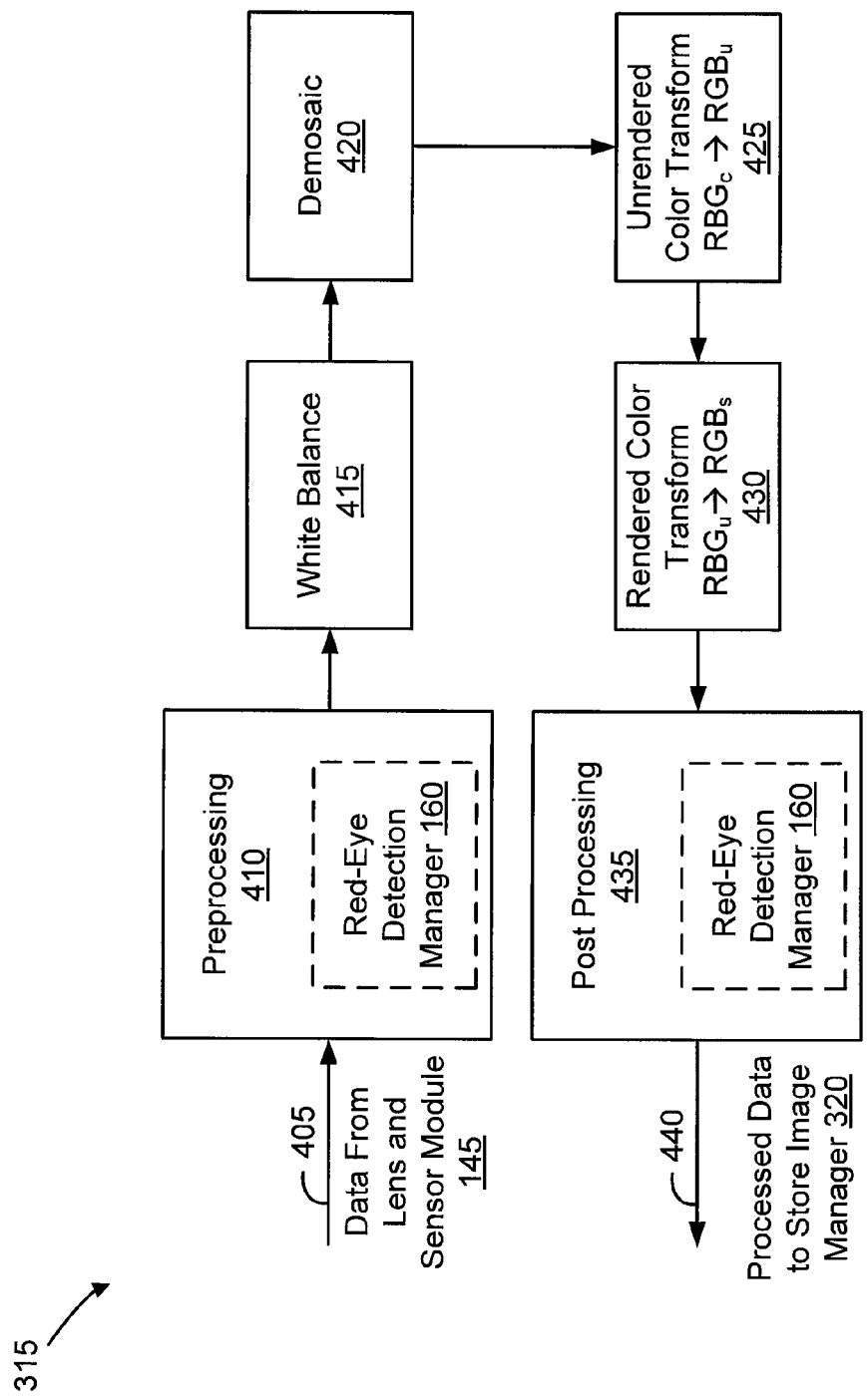
FIG. 4 is a data flow diagram that illustrates an embodiment of the architecture, functionality, and/or operation of a capture color manager, such as that shown in FIG. 3.

FIG. 4 is a data flow diagram that illustrates an embodiment of the architecture, functionality, and/or operation of the capture color manager 315, such as that shown in FIG. 3. The capture color manager 315 includes pre-processing 410 that receives at line 405 the electrical signals associated with the captured image from the lens and sensor module 145. Pre-processing 410 facilitates removing noise and other artifacts to produce an accurate or, alternatively, a pleasing representation of the captured image. A pre-processing method includes a defective pixel correction process. Pre-processing 410 can further include the red-eye detection manager 160 that facilitates detecting red-eye artifacts in the captured image.

Pre-processing 410 sends the pre-process data to white balance 415, which adjusts the relative amounts of red, green and blue primary colors in the pre-process data against "white" colors such that neutral colors are reproduced correctly. In other words, the white balance 415 adjusts the relative amounts of red, green and blue primary colors to maintain a color consistency based on "white" colors. White balance 415 sends the adjusted data to demosaic 420, which interpolates the adjusted data from partial raw data from the lens and sensor module 145 into a matrix of colored pixels. In general, demosaic 420 estimates the values of the pixel colors that were not measured based on pixel neighborhood information.

Demosaic 420 sends the interpolated data to unrendered color transform 425 that transforms the interpolated data based on unrendered color spaces, which are designed for a convenient storage or calculation medium. Color transformation 425 is generally based on careful visual experiments and good estimate of colors based on CIEXYZ space, ISO-RGB color space, or RIMM-RGG.

Color transformation 425 send the transformed data to rendered color transformation 430, which transforms the received data based on rendered colored spaces that are produced from the image data in the unrendered color space. The rendered color space can be defined in ITU-RBT.709-3 entitled "Parameter Values for the HDTV Standards for Production and International Programme Exchange."

The transformed data from the rendered color transformation 430 is sent to post-processing 435 which facilitates enhancing the image appearance that may be affected by the previous process, such as, preprocessing 410, white balance 415, demosaic 420, unrendered color transform 425, and rendered color transform 430. The post-processing 435 may also include the red-eye detection manager 160, which facilitates detecting red-eye artifacts in the digital image data. The post-process data is sent to stored image manager 320 via line 440. Operations of the red-eye detection manager 160 are described in relation to FIGS. 7-9.

Figure 5:
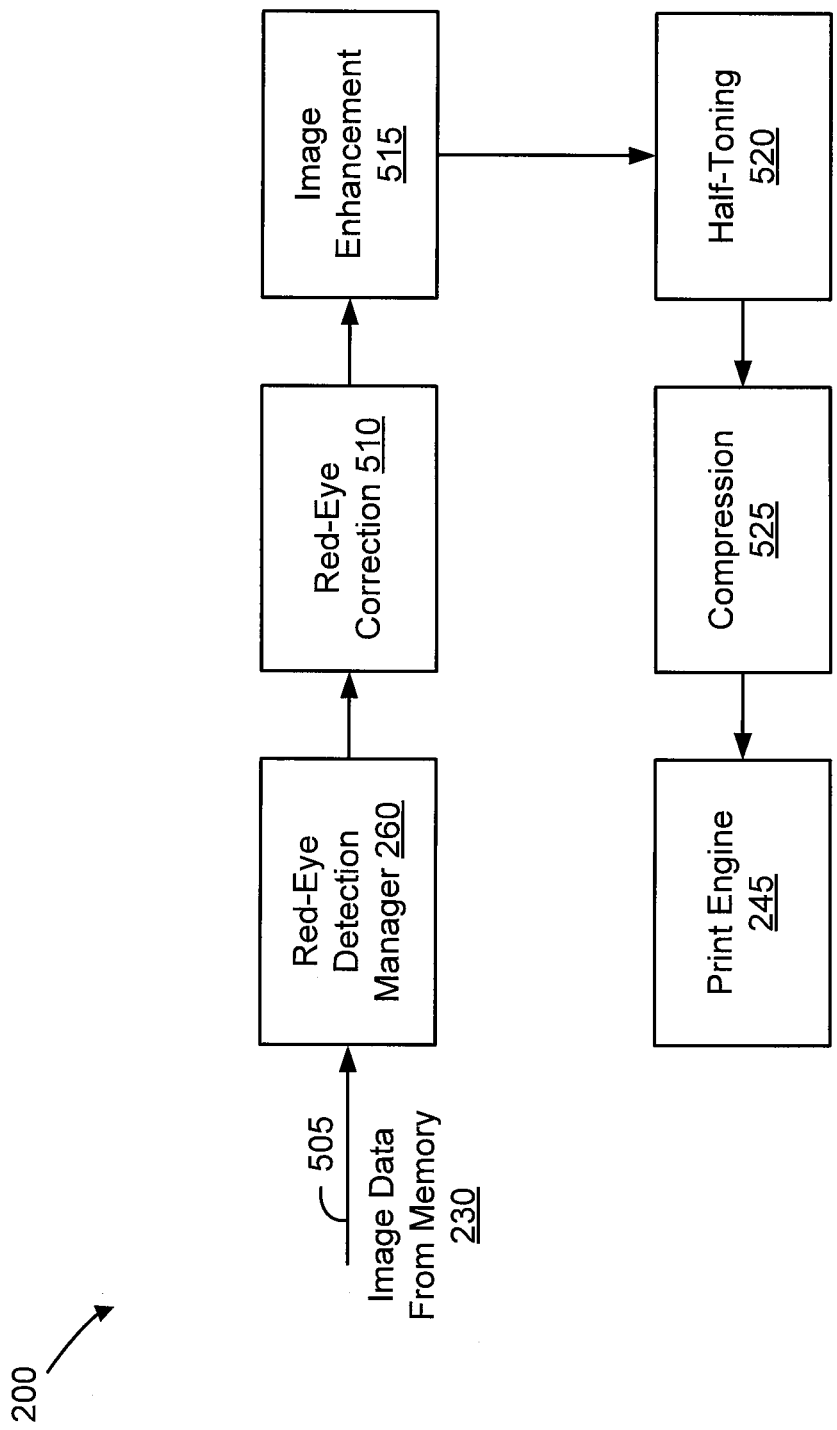
FIG. 5 is a data flow diagram that illustrates an embodiment of the architecture, functionality, and/or operation of the printing device, such as that shown in FIG. 2, that can detect red-eye artifacts.

FIG. 5 is a data flow diagram that illustrates an embodiment of the architecture, functionality, and/or operation of the printing device 200, such as that shown in FIG. 2, that can detect red-eye artifacts. The image data 505 from memory 230 includes captured image from, for example, a digital camera, scanner, and computing device. The image data 505 is sent to the red-eye detection manager 260 which facilitates detecting red-eye artifacts in the digital image. Operations of the red-eye detection manager 260 are described in relation to FIGS. 7-9.

The detected image data is sent to red-eye correction 510 which corrects the detected red-eye by changing the color red-eye to a black color or other colors. The corrected image data is then sent to image enhancement 515 which enhances the image due to the processing artifacts that were introduced in red-eye correction 510. The enhanced data is sent to half-toning 520 which processes the enhanced data to include a continuous-tone imagery through the use of equally spaced dots of varying size. The half tone data is then sent to compression 525 which reduces the file size depending on the resolution of the camera 100 and the format used to save the image. The compressed data is sent to print engine 245 which facilitates printing a photo of the compressed image.

Figure 6:
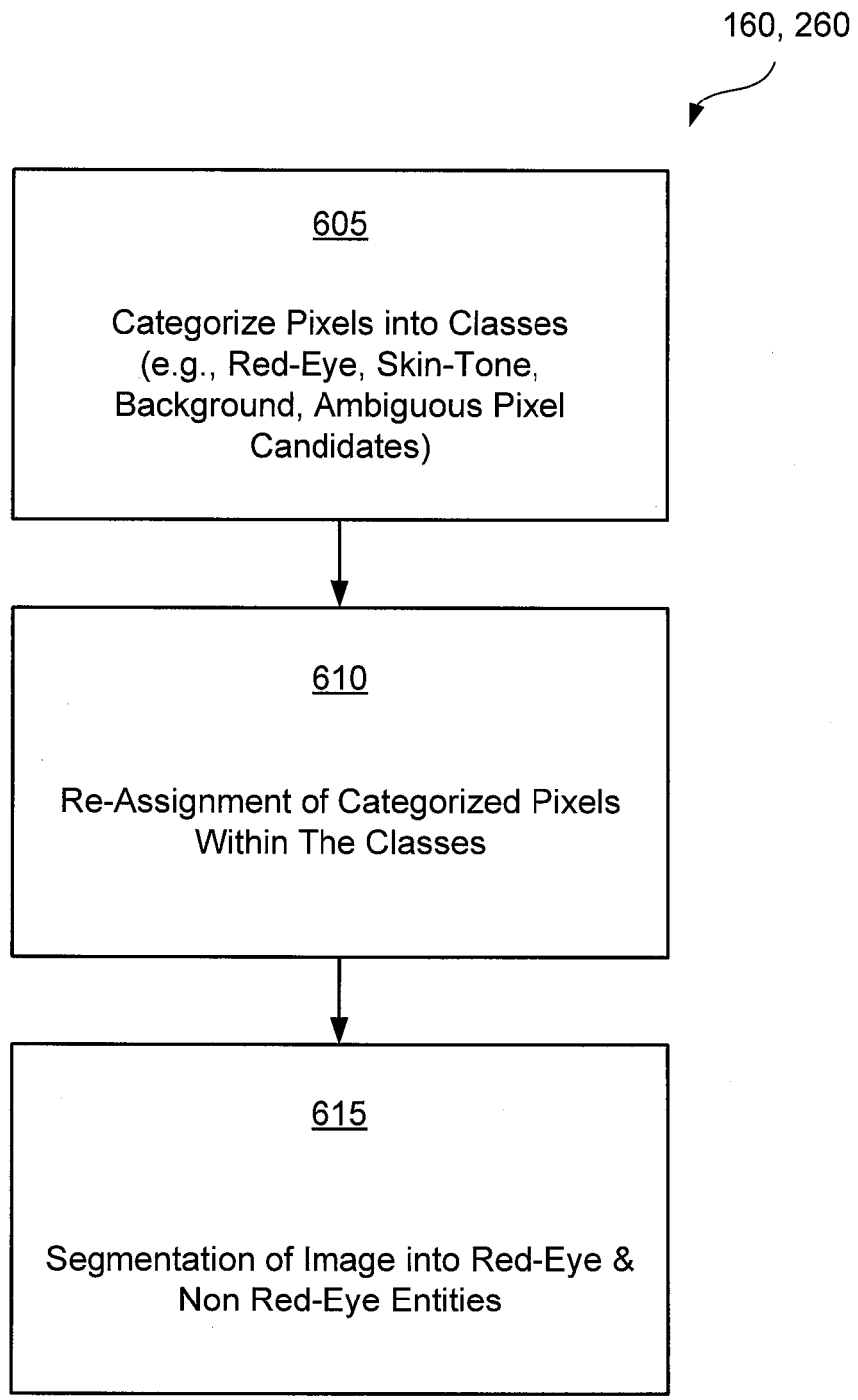
FIG. 6 is a high-level data flow diagram that illustrates an embodiment of the architecture, functionality, and/or operation of a red-eye detection manager, such as that shown in FIGS. 1-2.

FIG. 6 is a high-level data flow diagram that illustrates an embodiment of the architecture, functionality, and/or operation of the red-eye detection manager 160, 260, such as that shown in FIGS. 1-2. In general, the red-eye detection manager 160, 260 is configured to detect a red-eye in a digital image based on the detection of excited state of normal eye that causes red-eye. More specifically, the red-eye detection manager 160, 260 analyzes a relationship between the excited state of normal eye characterized by a probability distribution, e.g., Gibbs-Distribution, and the arrangement of pixels associated with a red-eye in the digital image, resulting in the detection of the red-eye.

In step 605, the red-eye artifact manager 160, 260 categorizes the pixels in the digital image into classes, such as, red-eye class, skin tone class, background class, and ambiguous class. The classification of the pixels is based on heuristic analysis and the resultant observation in, for example, three (3) different color spaces: 1) HSI (hue, color purity or saturation and intensity), 2) $YC_BC_R$ (luma component, blue and red chroma components) and 3) color normals. The red-eye artifact manager 160, 260 can analyze each classification of the pixels to determine the probability that a red-eye exist in the pixels associated with their respective classification. Thus, the classification of the pixels reduces the number of pixels that are analyzed for determining whether the digital image has a red-eye. Operations of the image pixel categorization are further described in relation to FIG. 7.

In step 610, the categorized pixels are reassigned based on a probability distribution, e.g., Markov Random Fields. The reassignment of labels is based on spatial dependencies which facilitate eliminating errors arising from the previous processing and refine the pixel classification. Alternatively or additionally, the reassignment can facilitate eliminating statistical errors, such as, false-positives and subsequent false negatives that may appear during the reassignment. Operations of the reassignment of the pixels are further described in relation to FIG. 8.

At step 615, the digital image is segmented into red-eye and non-red-eye entities based on contextual dependencies of the categorized pixels, which involve the arrangement of pixel neighborhood, also known as hue-clique. Hue-clique technique facilitates capturing the context associated with the pixels in terms of orientation and color texture of a given neighborhood of pixels. Corresponding potential energy is calculated based on the arrangement of pixel labels of the color cliques within the segmented portions of the digital image. The red-eye detection manager 160, 260 determines whether the segmented portions of the digital image contain a red-eye based on the calculated potential energy. The segmented portions that are suspected to have or not have a red-eye is categorized as red-eye entities and non-red-eye entities, respectively.

Alternatively or additionally, the segmented portion of the digital image that is suspected to have a red-eye is further examined to trace the red-eye pixels. The red-eyes can be detected in the digital images that are captured not only from near distances, e.g., five feet, but from afar, e.g., 20 feet. Operations of the segmentation of the image are further described in FIGS. 9A-B.

Figure 7:
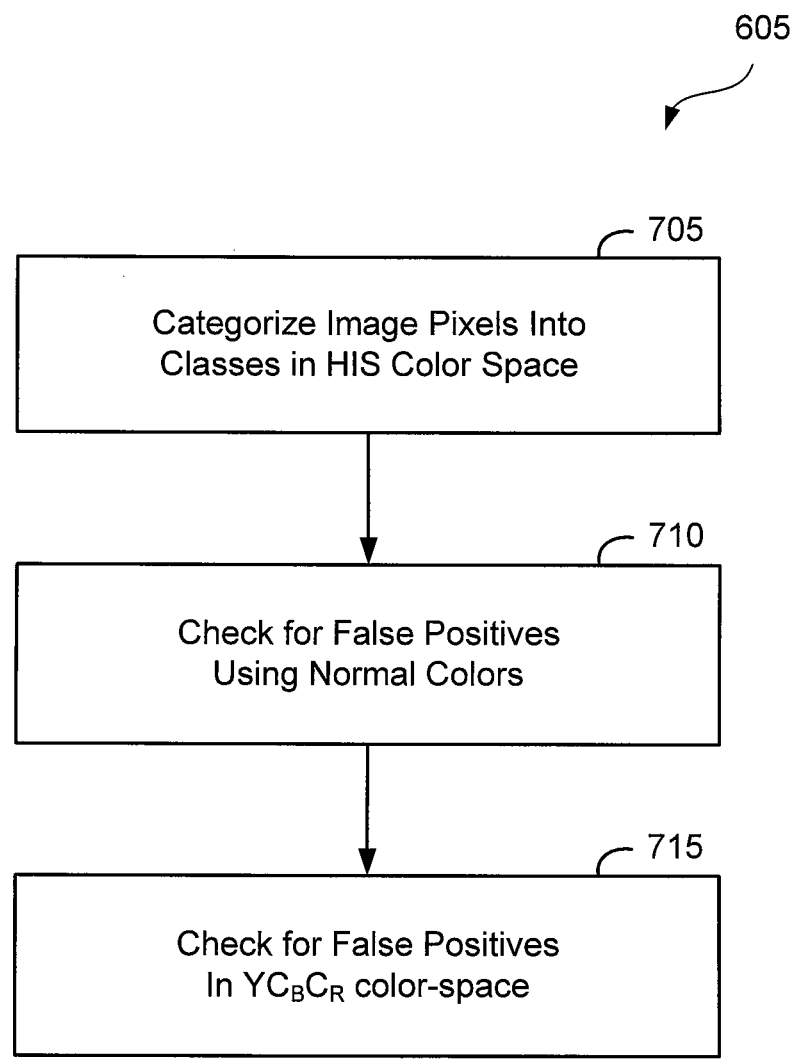
FIG. 7 is a flow diagram that illustrates an embodiment of the architecture, functionality, and/or operation of the step of categorizing image pixels, such as that shown in FIG. 6.

FIG. 7 is a flow diagram that illustrates an embodiment of the architecture, functionality, and/or operation of the step of categorizing image pixels 605, such as that shown in FIG. 6. It should be noted that image pixels can be categorized using, for example, color bands normalization, HSI and the $YC_BC_R$ color-space. An exemplary way of categorizing image pixels is using a set of If-Then rules that are based on heuristic dependent observations. In step 705, the image pixels are tested against these observations associated with, e.g., hue, intensity and color purity or saturation (HIS) color space and are categorized into classes, such as, red-eye class, skin tone class, background class and ambiguous class.

Alternatively or additionally, in step 710, the red-eye and the ambiguous classes are verified for false positives and false negatives based on heuristic observations using normal colors. In step 715, the ambiguous pixels are re-tested for false negatives based on heuristic observations based on luma component, blue and red chroma components ($YC_BC_R$) color-space.

The above categorizing ensures that most potential red-eye artifacts are recognized. The sequence of color-spaces that are tested reduces the number of pixels that is analyzed in further stages. A few components of a given color-space are useful in correct classification while others help in eliminating the false positives.

Figure 8:
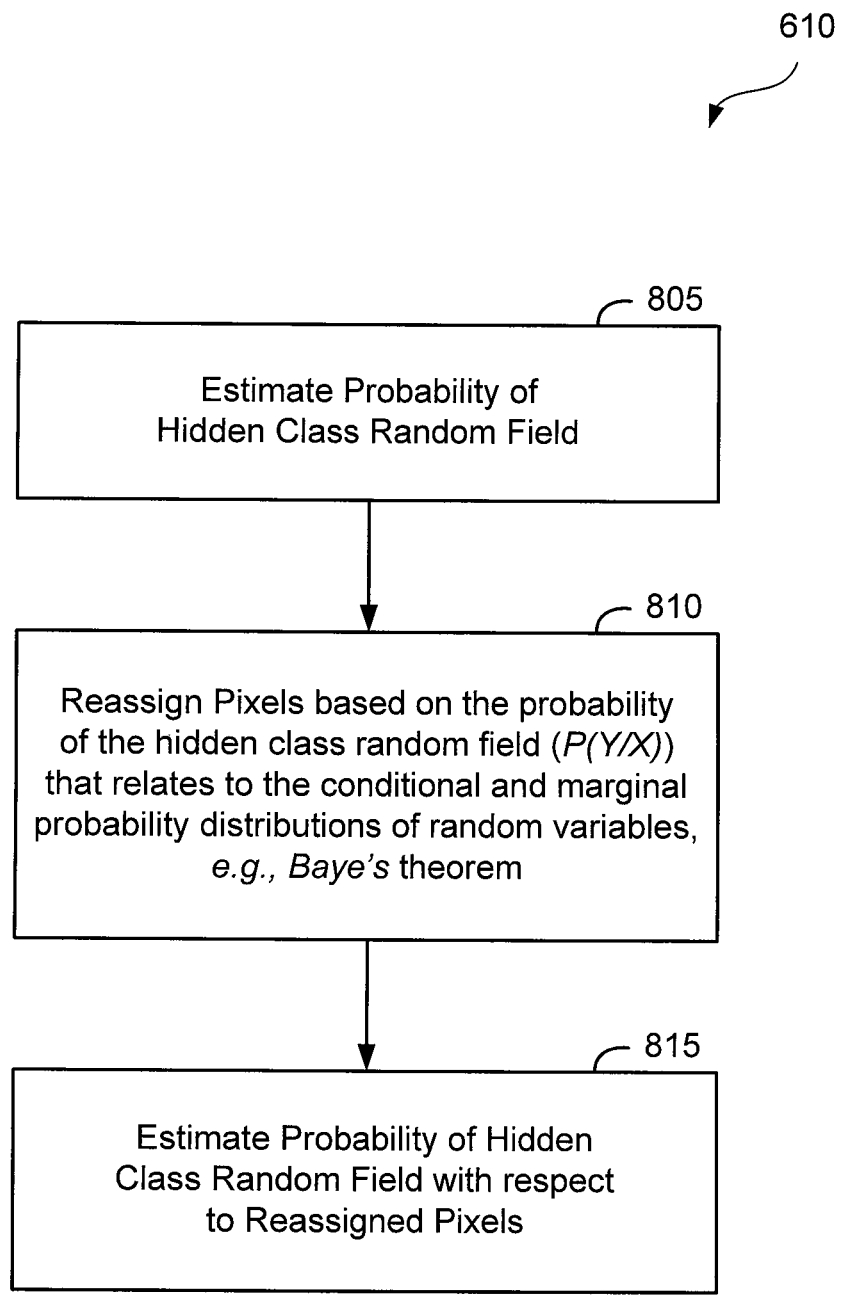
FIG. 8 is a flow diagram that illustrates an embodiment of the architecture, functionality, and/or operation of the step of reassigning image pixels, such as that shown in FIG. 6.

FIG. 8 is a flow diagram that illustrates an embodiment of the architecture, functionality, and/or operation of the step of reassigning image pixels 610, such as that shown in FIG. 6. In step 805, the categorized image obtained in step 605 is refined based on the probabilistic likelihood of assigning a particular pixel with aforementioned classes. This is done by estimating the maximum a-posteriori probability of the hidden class random field (P(Y)) based on, for example, Hammersley-Clifford Theorem, which is represented by the following equation.

$$P(Y) = \frac{1}{Z}e^{\beta V(y)} = \frac{1}{Z}e^{\beta \Sigma_{i,j} V_{i,j}(\partial_{i,j} Y\{y_{i,j}\})} \quad \text{(Eq. 1)}$$

where a rectangular image I refers to dimensions n by m, each pixel represents a site $s_{ij}$, and i and j represent the corresponding instances at a given site. Z, β, and V represent normalizing constant, temperature parameter (also called smoothness parameter in image classification), and partition function, respectively. Each site has an intensity value $X_{ij}$ and a corresponding hidden class random field variable $Y_{ij}$. V can be expressed as summation of potentials at each site. For example, pseudo likelihood estimator for 4 possible classes and a first order hidden class random field (e.g., 8 neighborhood of pixels) yields a value of β=1.5.

Assuming that the observed intensities $X_{ij}$ depend on class $Y_{ij}$ and are Gaussian (Normal), the pixels are reassigned in step 810 based on the probability of the hidden class random field (P(Y/X)) that relates to the conditional and marginal probability distributions of random variables using, for example, Baye's theorem:

$$P(Y \mid X) = P(X \mid Y)P(Y)/P(X) \quad \text{(Eq. 2)}$$

$$\propto P(X \mid Y) \cdot P(Y) \quad \text{(Since } P(X) \text{ is constant)}$$

$$= \frac{1}{Z} e^{\sum_{i,j} \beta_{i,j} n_{i,j(y_{i,j})}} \prod_{i,j} \frac{1}{\sqrt{2\pi\sigma_{y_{i,j}}^2}}$$

$$e^{-\frac{1}{2}\sigma_{y_{i,j}}^2 (x_{i,j} - \mu_{y_{i,j}})^2}$$

where μ, σ, and $n_{i,\ j(y_i,\ j)}$ refer to a mean for the class associated with the neighborhood of image pixels, variance for the class associated with the neighborhood of image pixels, and number of pixels around the pixel (P) located at (i, j), which have the same class as that of P, respectively. Alternatively, Eq. 2 can be represented in its logarithmic equivalent:

$$\lambda n P(Y|X) \propto \lambda n P(X|Y) + \lambda n P(Y) \quad \text{(Eq. 3)}$$

In step 815, by categorizing the pixels, the probability of the hidden class random field can be estimated with respect to class Y, which corresponds to obtaining the maximum a-posteriori estimate of:

$$Y\!:\!Y^* = \mathrm{argmax}_Y\{P(Y|X)\} \quad \text{(Eq. 4)}$$

where Y* refers to the most likely value/class of pixel for which the value of P(Y|X) is the maximum.

Figure 9:
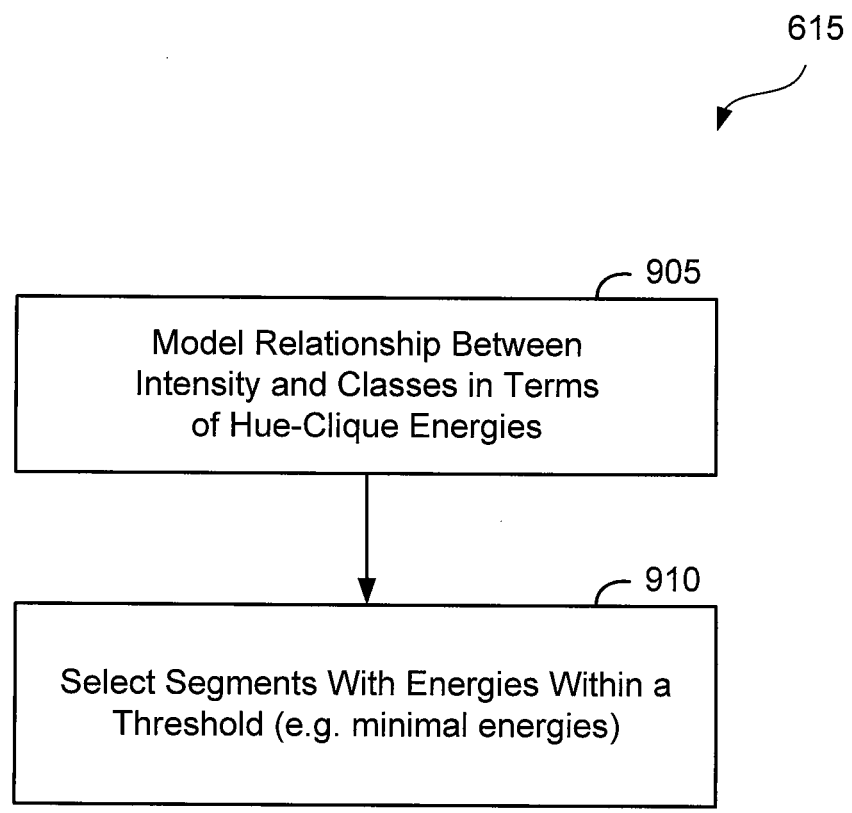
FIG. 9 is a flow diagram that illustrates an embodiment of the architecture, functionality, and/or operation of the step of segmenting image data, such as that shown in FIG. 6.

FIG. 9 is a flow diagram that illustrates an embodiment of the architecture, functionality, and/or operation of the step of segmenting the image data 615, such as that shown in FIG. 6. For every regular block of pixels of finite size, assuming that the pixel classes follow a Gaussian distribution, the corresponding potential energy is calculated based on the arrangement of pixel classes of the hue-cliques within that block. It is this energy which indicates whether the block contains a red-eye or not.

In step 905, the red-eye detection manager 160, 260 models the relationship between intensity of the color and class of reassigned pixels. The logarithmic terms in Eq. 3 can be treated as energies, which are represented by the following equation:

$$E_{Y/X} = \alpha \cdot E_{X|Y} + \beta \cdot E_Y \quad \text{(Eq. 5)}$$

where α and β refer to coefficients that signify the relationship of a-prior ($E_{X|Y}$) and posteriori ($E_Y$) energies with the resultant energy ($E_{Y/X}$), which should optimally be minimum for the solution to reach a required segmented state. The scaling coefficient a is formulated in terms of hue-cliques to account for the spatial and contextual dependencies of the classes of red-eye. Assuming a Gaussian distribution of the labels in a given neighborhood, the pixels can be represented by the following equation:

$$P(X = x_{i,j} \mid Y = y) = \frac{1}{\sqrt{2\pi\sigma_y^2}} e^{\frac{(x_{i,j} - \mu_y)^2}{2\sigma_y^2}} \quad \text{(Eq. 6)}$$

The corresponding energy gives an estimate of the a-priori energy ($E_{X|Y}$) of Eq. 5 as:

$$E(X = x_{i,j} \mid Y = y) = \frac{(x_{i,j} - \mu_y)^2}{2\sigma_y^2} + \lambda n \left[\sqrt{2\pi\sigma_y^2}\right] \quad \text{(Eq. 7)}$$

The posteriori energy ($E_y$) of Eq. 5 can be estimated from the partition function:

$$E_Y = \Sigma_{i,j} v_{i,j} \quad \text{(Eq. 8)}$$

where v refers to hue-clique strength and $v_{i,j} = +\gamma$ (if $v_i = v_j$) else $v_{ij} = -\gamma$ and the value of γ is assumed to be 1.

In step 910, the resultant energy ($E_{Y/X}$) of Eq. 5 is evaluated for all the segmented portions and the segments that are within a threshold energy are selected to be marked as red-eyes. The threshold is so chosen as to correspond to a minimal resultant energy ($E_{Y/X}$).

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. An image processing system that is to detect red-eye artifacts in a digital image comprising:
    a processing device that facilitates execution of programs stored in the image processing device; and
    memory that is electrically coupled to the processing device, the memory to store the programs that include a red-eye detection manager, the red-eye detection manager to characterize an excited state of a normal-eye by a probability distribution, detect a red-eye in the digital image based on the detection of the excited state of the normal-eye that causes the red-eye, calculate corresponding potential energy based on an arrangement of pixel labels of color cliques within segmented portions of the digital image, and determine whether the segmented portions of the digital image contain a red-eye based on the calculated potential energy.

2. The image processing system as defined in claim 1, wherein the red-eye detection manager is to further detect the red-eye in the digital image by analyzing a relationship between the excited state of a normal-eye and the arrangement of pixels related to the red-eye in the digital image.

3. The image processing system as defined in claim 1, wherein the red-eye detection manager is to further categorize pixels in the digital image into at least one of the following classes: red-eye class, skin-tone class, background class, and ambiguous class, wherein classification of the pixels is based on a heuristic analysis and resultant observation in a plurality of different color spaces.

4. The image processing system as defined in claim 3, wherein the red-eye detection manager is to further reassign the categorized pixels based on a further probability distribution.

5. The image processing system as defined in claim 4, wherein the red-eye detection manager is to further segment the digital image into red-eye and non-red-eye entities based on contextual dependencies of the categorized pixels, which involve the arrangement of pixel neighborhood.

6. The image processing system as defined in claim 1, wherein the red-eye detection manager is to trace the red-eye in the segmented portions of the digital image.

7. The image processing system as defined in claim 1, further comprising a lens and image sensor module that is to capture light of an image and convert the light into electrical signals, the electrical signals being used to facilitate generating the digital image.

8. The image processing system as defined in claim 1, further comprising a print engine that facilitates printing a photo of the digital image.

9. A method that detects red-eye artifacts in a digital image, the method comprising:
receiving a digital image;
characterizing an excited state of a normal-eye by a probability distribution;
detecting a red-eye in the digital image based on the detection of the excited state of the normal-eye that causes the red-eye;
calculating corresponding potential energy based on an arrangement of pixel labels of color cliques within segmented portions of the digital image; and
determining whether the segmented portions of the digital image contain a red-eye based on the calculated potential energy.

10. The method as defined in claim 9, further comprising detecting the red-eye in the digital image by analyzing a relationship between the excited state of normal-eye and the arrangement of pixels related to the red-eye in the digital image.

11. The method as defined in claim 9, further comprising categorizing pixels in the digital image into at least one of the following classes: red-eye class, skin-tone class, background class, and ambiguous class, wherein classification of the pixels is based on a heuristic analysis and resultant observation in a plurality of different color spaces.

12. The method as defined in claim 11, further comprising reassigning the categorized pixels based on a further probability distribution.

13. The method as defined in claim 12, further comprising segmenting the digital image into red-eye and non-red-eye entities based on contextual dependencies of the categorized pixels, which involve the arrangement of pixel neighborhood.

14. The method as defined in claim 9, further comprising tracing the red-eye in the segmented portions of the digital image.

15. The method as defined in claim 9, further comprising receiving the digital image via a lens and image sensor module that is to capture light of an image and convert the light into electrical signals, the electrical signals being used to facilitate generating the digital image.

16. The method as defined in claim 9, further comprising sending the digital image having the detected red-eye to a print engine that facilitates printing a photo of the digital image.

17. An image processing device that is to detect red-eye artifacts in a digital image comprising:
a processing device that facilitates execution of programs stored in the image processing device; and
memory that is electrically coupled to the processing device, the memory to store the programs that includes a red-eye detection manager, the red-eye detection manager to:
characterize an excited state of a normal-eye by a probability distribution,
detect a red-eye in the digital image based on the detection of the excited state of the normal-eye that causes the red-eye,
categorize pixels in the digital image into at least one of the following classes: red-eye class, skin-tone class, background class, and ambiguous class,
reassign the categorized pixels based on a further probability distribution,
segment the digital image into red-eye and non-red-eye entities based on contextual dependencies of the categorized pixels, which involve the arrangement of pixel neighborhood,
calculate corresponding potential energy based on an arrangement of pixel labels of color cliques within the segmented portions of the digital image, and
determine whether the segmented portions of the digital image contain a red-eye based on the calculated potential energy.

* * * * *